Dec. 9, 1947.    G. N. KAMM    2,432,199
WHEATSTONE BRIDGE METER
Filed Aug. 8, 1945

INVENTOR
GEORGE N. KAMM
BY
William D. Hall
ATTORNEY

Patented Dec. 9, 1947

2,432,199

UNITED STATES PATENT OFFICE 2,432,199

WHEATSTONE BRIDGE METER

George N. Kamm, Boston, Mass., assignor, by mesne assignments, to the United States of America, as represented by the Secretary of War Application August 8, 1945, Serial No. 609,653

3 Claims. (Cl. 171—95)

This invention relates generally to an electrical circuit and more specifically to a radio frequency power measuring circuit.

In measuring radio frequency (R.-F.) power, use is often made of a bridge network containing a temperature sensitive resistive element. The temperature sensitive resistive element may be of the thermistor type, a substance including nickel, manganese, and cobalt. The electrical resistance of the thermistor increases approximately exponentially as the internal temperature of the resistive element of the thermistor decreases.

A bead type thermistor may be used as the temperature sensitive resistive element, its resistance being controlled primarily by an electrical power input to the bead. The electrical power input may be a direct voltage, or an alternating voltage. The frequency of the alternating voltage must be sufficiently high to prevent the resistance of the thermistor from following the alternating variations. When the alternating voltage is as specified, the power dissipated in the bead will simply be a source of heat.

The internal temperature and therefore the resistance of the bead thermistor will also be a function of the ambient temperature, and a function of the R.-F. power dissipated in the bead. The thermal mass of the bead is quite small. Hence the heating due to a direct or an alternating current flowing through the bead will affect the resistance considerably more than that due to ambient temperature changes.

The ohms per watt sensitivity characteristic of the bead thermistor depends upon a constant K associated with the bead. The constant K is a function of the bead resistance and is therefore dependent upon the temperature of the bead.

It is an object of this invention to provide means for measuring R.-F. power. Another object is to make this measuring means sensitive to very small amounts of R.-F. power.

Figure 1:
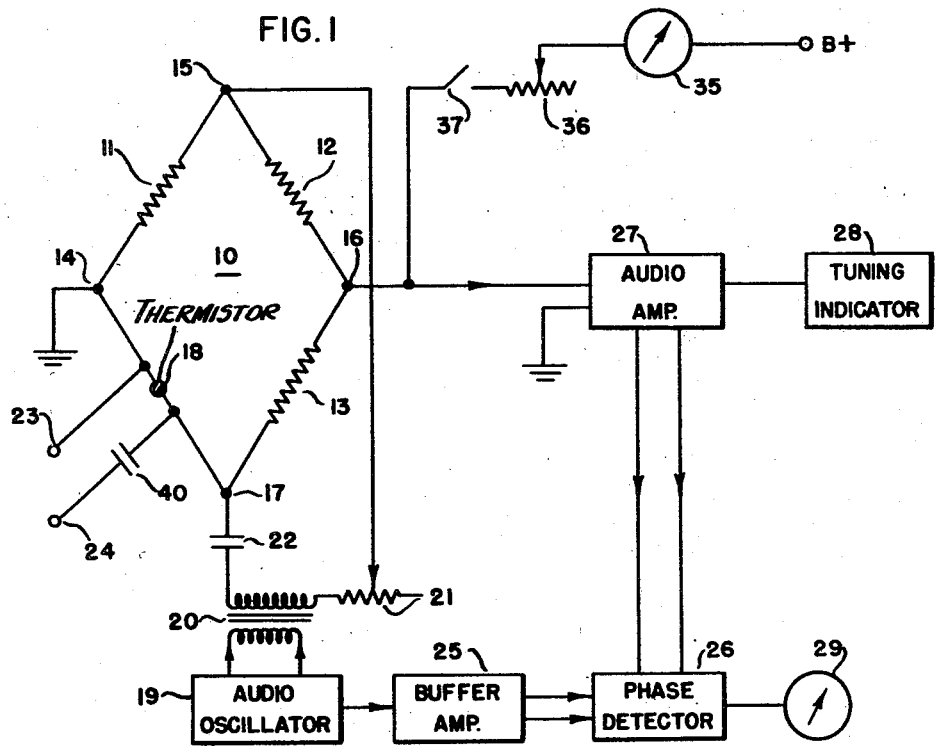
Figure 2:
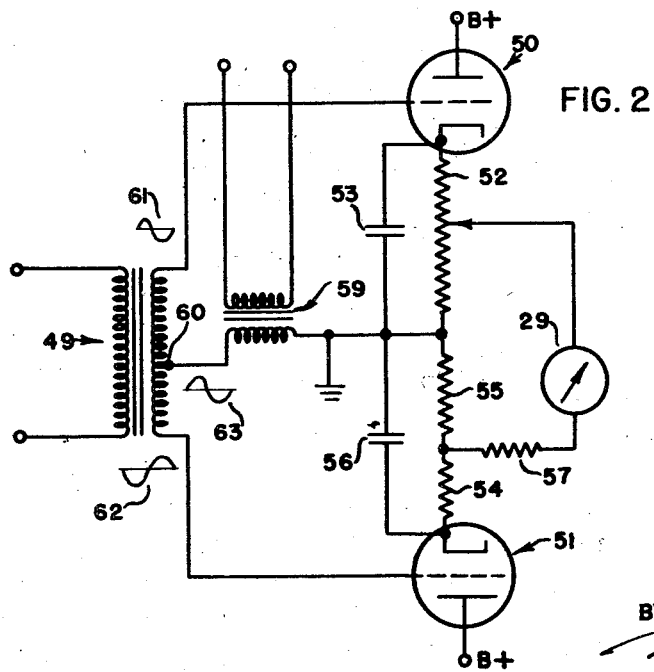

Other objects, features and advantages of this invention will suggest themselves to those skilled in the art and will become apparent from the following description of the invention taken in connection with the accompanying drawings in which:

Fig. 1 shows a block diagram of a circuit embodying the principles of this invention; and, Fig. 2 shows a schematic drawing of one form of phase detector which may be used in the circuit of Fig. 1.

Referring more specifically to Fig. 1 there is shown a bridge network 10 consisting of three fixed resistors 11, 12, and 13 connected between terminals 14 and 15, 15 and 16, and 16 and 17, respectively, and a thermistor bead 18 connected between terminals 14 and 17. An audio frequency from an audio oscillator 19 is applied through a transformer 20, a variable resistor 21 and a D.-C. blocking condenser 22 to the input terminals 15 and 17 of the bridge 10. A source of radio frequency power to be measured (not shown) is applied across terminals 23 and 24 and through a coupling condenser 40 to thermistor bead 18. The output of audio oscillator 19 is also fed through a buffer amplifier 25 to a phase detector 26. The audio output of bridge 10 is taken from the output terminals 14, 16 and applied to an audio amplifier 27. Associated with audio amplifier 27 is a tuning indicator 28 whose function will be described more fully later. The output of audio amplifier 27 is applied to the phase detector 26. A zero center galvanometer 29 will indicate the magnitude and phase of the D.-C. output of phase detector 26. By closing a switch 37, a D.-C. calibrating potential is applied through a milliammeter 35 and a dropping resistor 36 to the output terminals 14, 16 of bridge 10.

Fig. 2 is a circuit diagram of one possible embodiment of a phase detector 26 which may be used in the circuit of Fig. 1. A reference wave from audio oscillator 19 is applied, through the buffer amplifier 25, to the primary winding of a first transformer 49. The two ends of the secondary of transformer 49 are connected respectively to the two grids of vacuum tubes 50 and 51. The cathode of tube 50 is returned to ground through a parallel combination consisting of a potentiometer 52 and a capacitor 53. The cathode of tube 51 is returned to ground through a capacitor 56 connected in parallel with resistors 54 and 55 connected in series. The plate of each tube is connected to a suitable B+ potential. The zero center galvanometer 29 in series with a resistor 57 is connected between the variable tap of potentiometer 52 and the common connection between resistors 54 and 55. The audio frequency output voltage from audio amplifier 27 is applied to the primary winding of a second transformer 59. One end of the secondary winding of transformer 59 is grounded and the opposite end is connected to the center tap 60 of the secondary of the first transformer 49.

In measuring radio frequency power, one of two methods may be used. The bridge may be used as a balanced or as an unbalanced bridge. To calibrate the bridge 10 for use as an unbalanced bridge, switch 37 is first opened. The bridge is balanced for the audio frequency by adjusting variable resistor 21 until meter 29 reads zero. The manner in which the alternating voltage produces balance of the bridge circuit will be described more fully later. Then switch 37 is closed and a direct current power is applied to the bridge for calibrating the deflection of meter 29. If full-scale deflection of meter 29 is to correspond to a predetermined maximum power P, to be applied to the thermistor bead, then $I=2\sqrt{P/R_{th}}$ where I is the direct current indicated on the meter 35 and $R_{th}$ is the resistance of the thermistor bead 18. The factor of 2 is involved because only half of the meter current flows through the thermistor unit, assuming the two parallel branches to be of equal resistance. However, the factor will, of course, be different with branches of unequal resistance. When resistor 36 is adjusted to make meter 35 read the current calculated above, the thermistor bead will receive an amount of D.-C. power which is later to correspond to full-scale deflection of meter 29 when R.-F. power is applied to the thermistor bead. With the switch 37 still closed, the gain of the audio amplifier 27 is now adjusted for full-scale deflection of meter 29.

The amplitude of the alternating voltage signal applied to the bridge will determine the power dissipated in the thermistor and hence its resistance. Since the bead thermistor used in this apparatus should be chosen so the bead resistance will not follow the alternating voltage variations, the alternating voltage will simply act as a source of heat for the thermistor. The lower the ambient temperature the greater is the alternating voltage that must be appled to the bridge.

When the bridge 10 is unbalanced, an alternating signal, whose magnitude will depend upon the amount of unbalance and whose phase relation to the oscillator voltage will depend upon the direction of unbalance, will appear across the output terminals 14 and 16. When the bridge is unbalanced in one direction, the amplified bridge output will appear at the secondary winding of transformer 59 as a wave 63 in phase with reference wave 61, at the upper end of the secondary of transformer 49. The voltage developed across the bias resistors 52, 54, 55 in the cathode circuits of tubes 50 and 51, during the positive alternation of the input signal, tends to be maintained, during the negative alternation, by the discharge of the shunting capacitors 53, 56 through the said bias resistors. Hence, the current flowing through tubes 50 and 51 will depend upon the bias which is, in turn, dependent upon the amplitude of the alternating signal on the grid. Tube 50 will conduct less current and tube 51 will conduct more current according to the phase relations illustrated in Fig. 2. Meter 29 will then indicate an unbalance in one direction. When the bridge 10 is unbalanced in the opposite direction the phase of wave 63 will be reversed, so as to be in phase with reference wave 62 at the lower end of the secondary of said transformer 49, and tube 51 will conduct less current and tube 50 will conduct more current. Meter 29 will then indicate an unbalance in the opposite direction.

Adjusting the alternating voltage until the resistance of the thermistor is correct for bridge balance will insure the thermistor operating on the correct ambient characteristic where its value of K is always constant at balance. For this condition of balance the alternating voltage output from terminals 14, 16 of the bridge will be zero.

In calibrating the phase detector output meter 29 for zero deflection with zero R.-F. power input, the alternating voltage is adjusted until an alternating voltage of zero amplitude appears at the output terminals 14, 16. Zero bridge output is indicated by the tuning indicator 28, or more accurately by a zero reading of meter 29.

In calibrating the phase detector output meter 29 for full-scale deflection, the alternating voltage producing balance along with the direct calibrating voltage is applied to the bridge. The direct current representing a power P will unbalance the bridge and an alternating voltage proportional to the amount of unbalance is taken from the output terminals 14, 16. As has been described above, the gain of the amplifier 27 is adjusted for full-scale reading of meter 29.

The tuning indicator 28 associated with the audio amplifier may be an electron ray type tube. The eye of the tube will open to a maximum at balance and close to a minimum on either side of balance.

At low powers the meter 29 associated with the phase detector 26 affords a more sensitive indication of balance than the tuning indicator 28.

As the bridge 10 has now been calibrated for unbalanced operation, and assuming linear amplification and detection, the meter 29 reading will be nearly linear with radio frequency power, its full scale reading being proportional to the predetermined value of power.

In balanced bridge operation, the device can readily be used to set a source of radio frequency power to a given level. To calibrate the apparatus for balanced bridge operation, a current equivalent to a required power is set by adjusting variable resistor 36 with switch 37 closed. The bridge is then balanced with the audio voltage by adjusting variable resistor 21. Upon opening switch 37, the D.-C. power is removed and the radio frequency power can be applied through terminals 23 and 24 until balance is again obtained. The R.-F. power has now been set to a predetermined value. Either the tuning indicator 28 or the meter 29 may be used to indicate balance by a null indication.

The buffer amplifier 25 will prevent undesirable feedback between the phase detector 26 and the audio voltage supply 19 of the bridge.

When this device is properly calibrated, it is particularly well adapted to the measurement of fairly wide ranges of power in the microwatt region. The accuracy of the bridge does not depend on ambient temperature as it is calibrated each time it is to be used. The only probable errors will be the drift of the bridge during a measuring interval and this disadvantage can be minimized by frequent checks.

The use of a phase detector offers several advantages. The direction of the bridge unbalance is indicated by the direction of deflection of the meter. The detector will be selective to the oscillator frequency because the meter will not respond to the rapid phase shifting produced by any pick up frequency.

In addition, the detector is responsive only to the resistive unbalances in the bridge and the distributive capacitances in the bridge producing voltage components 90° out of phase will be cancelled out in the phase detector. Any capacitive component of unbalance voltage will appear at the center tap of transformer 49 as a signal 90° out of phase with both reference signals 61 and 62 at the transformer secondary. The unbalance voltage signal when added to the reference voltage signals will produce two signals of equal amplitude but of different phase at the grids of tubes 50 and 51. The D.-C. component of conduction current appearing at the cathodes of the two tubes will be equal for the two equal amplitude grid signals. Hence bridge unbalance voltages which are 90° out of phase with both reference signals will produce no net D.-C. output on the phase detector output meter.

For measuring radio frequency power, particular attention must be paid to matching the impedance of the thermistor unit to the R.-F. transmission line.

While there has been described hereinabove what is at present considered to be a preferred embodiment of this invention, it will be obvious to those skilled in the art that various changes and modifications may be made therein without departing from the scope of the invention as set forth in the appended claims.

What I claim is:

1. In combination a bridge measuring circuit consisting of three fixed resistors and a temperature-sensitive resistive element, the resistance of said temperature-sensitive resistive element being variable over a certain range according to the amount of electrical power said element absorbs, an alternating voltage of controllable amplitude, means for applying said alternating voltage to said bridge to produce a variable amplitude reversible phase alternating voltage output, a calibrating direct voltage, means for applying and metering said direct voltage to the output terminals of said bridge, the amplitude and phase of said output of said bridge being responsive to the resistance of said temperature-sensitive element, means for amplifying the alternating voltage output of said bridge, means associated with said amplifying means for indicating the amplitude of said alternating output, means for producing a reference voltage of the same frequency as said alternating voltage input to the bridge, means utilizing said reference voltage for converting said alternating voltage output into a direct current whose magnitude is proportional to the amplitude of said output, the sense of said direct current being dependent upon the phase of said output.

2. In combination a bridge measuring circuit, said bridge consisting of three fixed resistors and a temperature-sensitive resistive element, the resistance of said temperature-sensitive resistive element being variable over a certain range according to the amount of electrical power said element absorbs, a calibrating direct voltage, means for applying and metering said direct voltage to the output terminals of said bridge, a source of alternating voltage, means for applying said alternating voltage to said bridge to produce a variable amplitude reversible phase alternating voltage output whose value is dependent upon the resistance of said temperature-sensitive element, means utilizing a reference voltage synchronized with said applied alternating voltage for converting said alternating voltage output into a direct voltage whose magnitude is proportional to the amplitude and direction is dependent on the phase of said alternating voltage output.

3. In a bridge measuring circuit, a Wheatstone bridge, including two input terminals, two output terminals and four resistance elements interposed between said terminals, three of said resistance elements being substantially nontemperature-sensitive and the fourth being temperature-sensitive, a source of alternating voltage, means to apply said alternating voltage across the input terminals, an amplifier connected to the output terminals, a phase detector, said detector including a first transformer having a center-tapped secondary, a pair of triodes, connections from the ends respectively of the secondary of the first transformer to the grids of the two tubes, a second transformer having its secondary connected in series with the center tap of the secondary of the first transformer and the anodes of both tubes, a bias resistance circuit connecting the cathodes of both tubes, said circuit having a central tap and two intermediate taps on opposite sides respectively of the central tap, a pair of capacitors connected respectively between the ends of the bias resistance circuit and the central tap thereof, a zero center direct current meter connected between the intermediate taps of the bias resistance circuit and a connection between the central tap of the bias resistance circuit and the anodes of the two tubes, means to feed a portion of the alternating voltage, as a reference voltage, to the primary of the first transformer, means to feed a portion of the output of the amplifier to the primary of the second transformer, a source of direct current, a direct current meter, and means for connecting said direct current source and meter in series across the output terminals of the bridge for calibration of the phase detector.

GEORGE N. KAMM.

REFERENCES CITED

The following references are of record in the file of this patent:

UNITED STATES PATENTS

| Number | Name | Date |
|---|---|---|
| 1,121,834 | Hiatt | Dec. 22, 1914 |
| 1,590,420 | Chubb | June 29, 1926 |
| 1,665,397 | Wunsch | Apr. 10, 1928 |
| 1,901,741 | Fetsch | Mar. 14, 1933 |
| 2,338,732 | Nosker | Jan. 11, 1944 |
| 2,399,481 | George | Apr. 30, 1946 |

FOREIGN PATENTS

| Number | Country | Date |
|---|---|---|
| 363,856 | Italy | Oct. 15, 1938 |

OTHER REFERENCES

"Alternating Current Bridge Methods," by Hague, 4th ed., 1938, pages 244 and 245. Published by Pitman Publishing Corp., 2 West 45th St., New York, N. Y.